United States Patent
Wu

(10) Patent No.: US 11,893,747 B2
(45) Date of Patent: Feb. 6, 2024

(54) IMAGE SEGMENTATION METHOD AND ELECTRONIC DEVICE

(71) Applicant: Coretronic Corporation, Hsin-Chu (TW)

(72) Inventor: Huai-En Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 400 days.

(21) Appl. No.: 17/364,892

(22) Filed: Jul. 1, 2021

(65) Prior Publication Data

US 2022/0005202 A1  Jan. 6, 2022

(30) Foreign Application Priority Data

Jul. 2, 2020 (CN) .......................... 202010633620.4

(51) Int. Cl.
*G06T 7/143* (2017.01)
*G06T 7/12* (2017.01)

(52) U.S. Cl.
CPC ............... *G06T 7/143* (2017.01); *G06T 7/12* (2017.01)

(58) Field of Classification Search
CPC .............................................. G06T 7/10–194
See application file for complete search history.

(56) References Cited

U.S. PATENT DOCUMENTS 5,832,111 A    11/1998  Florent
7,336,826 B2    2/2008  Shin
2011/0222769 A1*  9/2011  Galic .................. G06V 30/1478
                                                                 382/229
2015/0169956 A1*  6/2015  You .......................... G06T 7/246
                                                                 382/103
2020/0327350 A1* 10/2020  Anand .................... G06V 20/56

FOREIGN PATENT DOCUMENTS

CN    103150543    6/2013
CN    103091331   12/2014
CN    104504681    4/2015
TW       I652627    3/2019

OTHER PUBLICATIONS

Rafael C. Gonzalez et al., "Digital Image Processing, Third Edition", Pearson Education International, Oct. 2017, pp. 1-976.
Wen-Xiong Kang et al., "The Comparative Research on Image Segmentation Algorithms", 2009 First International Workshop on Education Technology and Computer Science, Mar. 2009, pp. 1-5.

* cited by examiner

*Primary Examiner* — Casey L Kretzer
(74) *Attorney, Agent, or Firm* — JCIPRNET

(57) ABSTRACT

The invention provides an image segmentation method and an electronic device. The image segmentation method includes the following steps. Regression analysis is performed on a first gray-scale image to obtain a residual image having an object backbone area. A pixel value of each pixel in the object backbone area is defined as an average gray-scale value of the object backbone area in the residual image, and a second gray-scale image having the object backbone area is generated. It is recursively determined whether a residual polarity of each adjacent pixel adjacent to edge pixels of the object backbone area in the residual image is the same as a residual polarity of the corresponding edge pixel, and whether a pixel value of each adjacent pixel is greater than a first threshold, so as to expand the object backbone area in the second gray-scale image, which is extracted as a target object.

18 Claims, 6 Drawing Sheets

IMAGE SEGMENTATION METHOD AND ELECTRONIC DEVICE

CROSS-REFERENCE TO RELATED APPLICATION

This application claims the priority benefit of China application serial no. 202010633620.4, filed on Jul. 2, 2020. The entirety of the above-mentioned patent application is hereby incorporated by reference herein and made a part of this specification.

BACKGROUND

Technical Field

The disclosure relates to an image processing technology, and in particular, to an image segmentation method and an electronic device.

Description of Related Art

The image segmentation technology in digital image processing has been a key technology in the field of image processing and computer vision for a long time. Especially when using digital images as a medium to estimate, analyze, check or measure an object in a target area, the first condition is to define a clear range of the target object in the image. However, the conventional image segmentation is based on the distribution of a color space or a gray level space, and does not consider the unevenness of illumination or the great changes in reflection brightness of the object itself. In other words, the determination information based on which the conventional image segmentation is performed does not distinguish whether the pixels belong to the background or the object, or whether the pixels belong to a position near a boundary. As a result, there are usually a large amount of noises or a determined object range is incomplete in the conventional image segmentation. In view of this, with respect to how to implement effective image segmentation to increase the reliability and usability of image segmentation, solutions of several embodiments are proposed below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides an image segmentation method and an electronic device, which can segment a target object in an image from a background image, so as to effectively extract the target object.

In order to realize one, part or all of the above purposes or other purposes, the image segmentation method provided by the invention includes the following steps. A first gray-scale image is obtained. Regression analysis is performed on the first gray-scale image to obtain a residual image, and an object backbone area of the residual image is determined. An average gray-scale value of the object backbone area in the residual image is calculated to define a pixel value of each pixel in the object backbone area as the average gray-scale value, and a second gray-scale image having the object backbone area is generated. It is recursively determined whether a residual polarity of each of a plurality of adjacent pixels adjacent to a plurality of edge pixels of the object backbone area in the residual image is the same as a residual polarity of the corresponding edge pixel, and whether a pixel value of each of the plurality of adjacent pixels in the residual image is greater than a respectively corresponding first threshold, so as to expand the object backbone area in the second gray-scale image; and extracting the object backbone area in the second gray-scale image subjected to recursive determination as a target object.

In order to realize one, part or all of the above purposes or other purposes, the electronic device having an image segmentation function provided by the invention includes an image sensor and a processor. The image sensor is configured to obtain a first gray-scale image towards a target area. The processor is coupled to the image sensor. The processor is configured to execute the following operations. Regression analysis is performed on the first gray-scale image to obtain a residual image, and an object backbone area of the residual image is determined. An average gray-scale value of the object backbone area in the residual image is calculated to define a pixel value of each pixel in the object backbone area as the average gray-scale value, and a second gray-scale image having the object backbone area is generated. It is recursively determined whether a residual polarity of each of a plurality of adjacent pixels adjacent to a plurality of edge pixels of the object backbone area in the residual image is the same as a residual polarity of the corresponding edge pixel, and whether a pixel value of each of the plurality of adjacent pixels in the residual image is greater than a respectively corresponding first threshold, so as to expand the object backbone area in the second gray-scale image. The object backbone area in the second gray-scale image subjected to the recursive determination is extracted as a target object in the target area.

Based on the above, the image segmentation method and the electronic device provided by the invention can perform image analysis and processing on the gray-scale image, such that the electronic device can automatically segment the target object in the gray-scale image from the background image, so as to effectively extract the target object in the image.

To make the features and advantages of the invention clear and easy to understand, the following gives a detailed description of embodiments with reference to accompanying drawings.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical content, features, and efficacy of the invention will be clearly presented in the detailed description of an exemplary embodiment with reference to the accompanying drawings. The directional terms mentioned in the following embodiments, such as "above," "below," "left," "right," "front," and "back," refer to the directions in the accompanying drawings. Therefore, the directional terms are only used for illustration instead of limiting the invention.

To make the content of the invention more comprehensible, embodiments are described below as examples according to which the invention can indeed be implemented. Wherever possible, the same reference numbers are used in the accompanying drawings and the description to refer to the same or like parts, components or steps.

Figure 1:
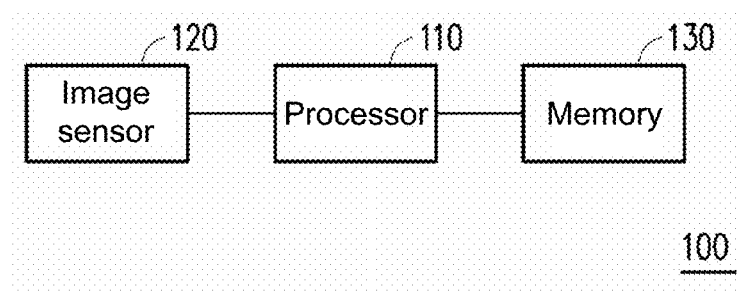
FIG. 1 is a functional block diagram of an electronic device according to an embodiment of the invention.

FIG. 1 is a functional block diagram of an electronic device according to an embodiment of the invention. Referring to FIG. 1, an electronic device 100 of the embodiment has an image segmentation function. The electronic device 100 includes a processor 110, an image sensor 120, and a memory 130. The processor 110 is coupled to the image sensor 120 and the memory 130. In the embodiment, the memory 130 may be configured to store a plurality of image processing programs for realizing the image segmentation function of the invention and a plurality of images generated in an image segmentation process for the processor 110 to read. In the embodiment, the plurality of image processing programs are established based on image segmentation methods described in the embodiments of the invention, and the image segmentation methods described in the embodiments of the invention may be implemented by adopting, for example, a derivative, an improvement or a variation of at least one of a threshold based method, an edge (gradient) based method, a region based method, a clustering method, a spectral clustering method, a watershed method, a level set method, and a neural network based method. In the embodiment, the electronic device 100 may be used, for example, in a manufacturing process of a display device, to capture images of the display device and perform image analysis, so as to automatically determine whether there are unexpected objects on a display surface of the display device. In other words, the target object described in each embodiment of the invention refers to an unexpected object automatically identified by the electronic device 100 aiming at the image of a target area.

In the embodiment, the processor 110 includes a central processing unit (CPU) with an image processing function, or other programmable general-purpose or special-purpose microprocessors, Image Processing Units (IPU), graphics processing units (GPU), digital signal processors (DSP), application specific integrated circuits (ASIC), Field-Programmable Gate Arrays (FPGA), other similar operation circuits or a combination of these circuits. In the embodiment, the image sensor 120 may be a camera. In the embodiment, the memory 130 may be, for example, a dynamic random access memory (DRAM), a flash memory, or a non-volatile random access memory (NVRAM).

In the embodiment, the image sensor 120 is configured to obtain a first gray-scale image towards a target area and provide the first gray-scale image to the processor 110. The processor 110 performs regression analysis on the first gray-scale image to obtain a residual image, and determines an object backbone area of the residual image. The processor 110 calculates an average gray-scale value of the object backbone area in the residual image to define a pixel value of each pixel in the object backbone area as the average gray-scale value, and generates a second gray-scale image having the object backbone area. Then, the processor 110 recursively determines whether a residual polarity of each of a plurality of adjacent pixels adjacent to a plurality of edge pixels of the object backbone area in the residual image is the same as a residual polarity of the corresponding edge pixel, and whether a pixel value of each of the plurality of adjacent pixels in the residual image is greater than a first threshold corresponding to each of the plurality of adjacent pixels, so as to expand the object backbone area in the second gray-scale image. Therefore, the processor 110 may extract the object backbone area in the second gray-scale image subjected to recursive determination as a target object (object image) in the target area.

It should be noted that the edge pixel mentioned above refers to a pixel adjacent to a non-object backbone area in the object backbone area, and the adjacent pixel refers to a pixel adjacent to the edge pixel of the object backbone area in the non-object backbone area. Moreover, the first threshold corresponding to each of the plurality of adjacent pixels in the embodiment is a median of a pixel value of each corresponding edge pixel in the second gray-scale image (i.e., the average gray-scale value) and a pixel value of each corresponding adjacent pixel in the background image. In addition, the regression analysis performed by the processor 110 refers to that the processor 110 executes one or more specific functions to perform an operation on each pixel in the image sequentially (recursively).

Figure 2:
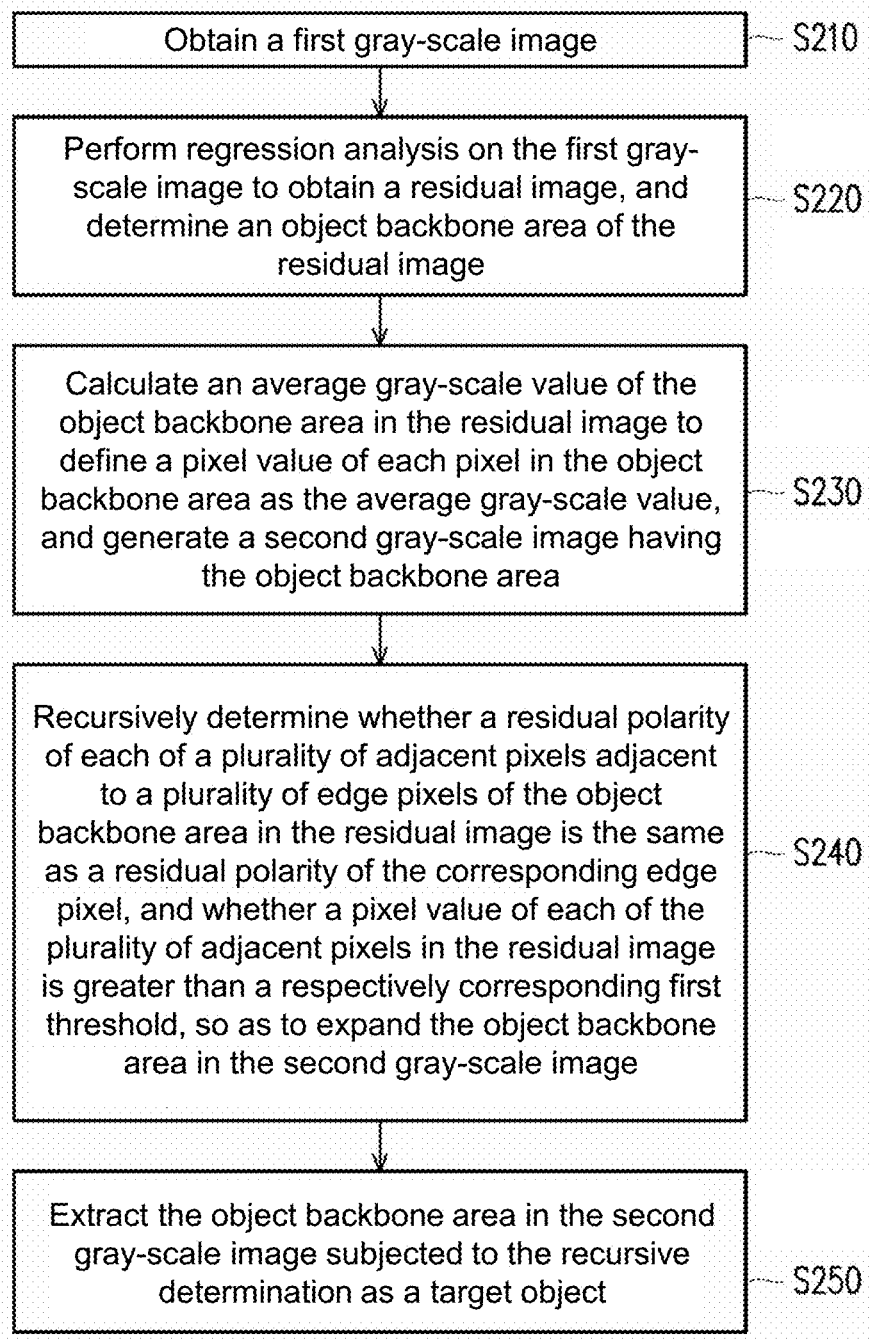
FIG. 2 is a flowchart of an image segmentation method according to an embodiment of the invention.

FIG. 2 is a flowchart of an image segmentation method according to an embodiment of the invention. FIG. 5A to FIG. 5E are schematic pictures of a plurality of images according to an embodiment of the invention. Referring to FIG. 1, FIG. 2 and FIG. 5A to FIG. 5E, the image segmentation method of the embodiment may be applied at least to the electronic device 100 of the embodiment illustrated in FIG. 1. The electronic device 100 may perform steps S210 to S250 to generate FIG. 5A to FIG. 5E in sequence. In step S210, the image sensor 120 obtain a first gray-scale image 501 as illustrated in FIG. 5A towards a target area. In step S220, the processor 110 performs regression analysis on the first gray-scale image 501 to obtain a residual image, and determines an object backbone area of the residual image. In step S230, the processor 110 calculates an average gray-scale value of the object backbone area in the residual image to define a pixel value of each pixel in the object backbone area as the average gray-scale value, and generates a second gray-scale image 504 having the object backbone area MA2 as illustrated in FIG. 5D. In step S240, the processor 110 recursively determines whether a residual polarity of each of a plurality of adjacent pixels adjacent to a plurality of edge pixels of the object backbone area in the residual image is the same as a residual polarity of the corresponding edge pixel, and whether a pixel value of each of the plurality of adjacent pixels in the residual image is greater than a first threshold corresponding to each of the plurality of adjacent pixels, so as to expand the object backbone area MA2 in the second gray-scale image 504, and generates a second gray-scale image 505 subjected to recursive determination as illustrated in FIG. 5E. In step S250, the processor 110 extracts the object backbone area MA3 in the second gray-scale image 505 subjected to the recursive determination as a target object. Therefore, the image segmentation method and the electronic device 100 of the embodiment can effectively segment the target object (object image) in the image of the target area from the background image, so as to correctly identify a position of the target object. Moreover, details of step S220 will be further described below through the flow illustrated in FIG. 3 and FIG. 4.

Figure 3:
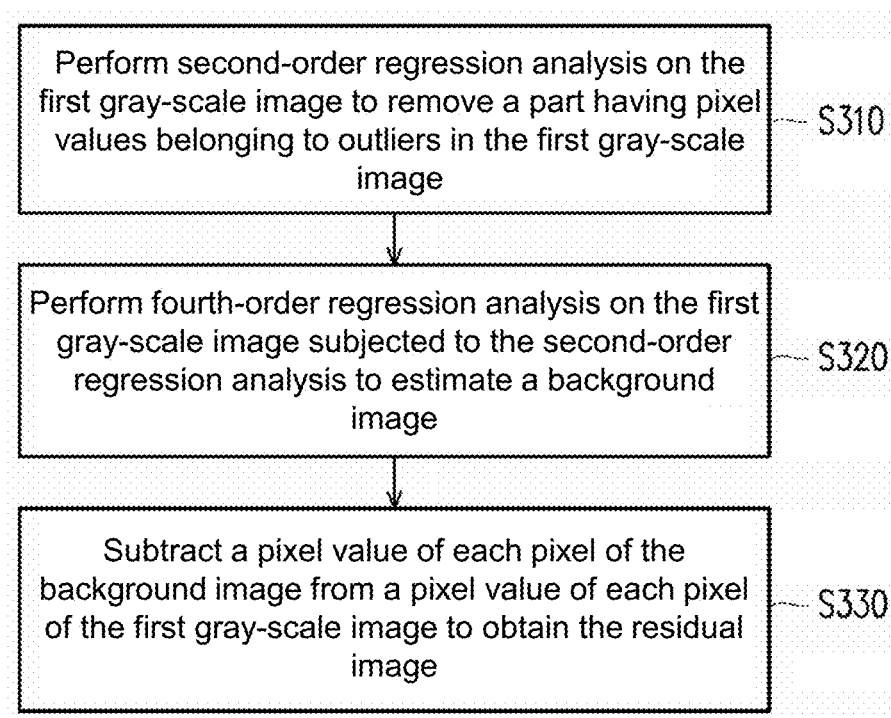
FIG. 3 is a flowchart of obtaining a residual image according to an embodiment of the invention.

FIG. 3 is a flowchart of obtaining a residual image according to an embodiment of the invention. In one embodiment, with respect to step S220 of the embodiment illustrated in FIG. 2, the processor 110 may further perform steps S310 to S330 in FIG. 3 to obtain the residual image. In step S310, the processor 110 performs second-order regression analysis on the first gray-scale image 501 to remove a part having pixel values belonging to outliers in the first gray-scale image. In step S320, the processor 110 performs fourth-order regression analysis on the first gray-scale image 501 subjected to the second-order regression analysis to estimate a background image. In step S330, the processor 110 subtracts a pixel value of each pixel of the background image from a pixel value of each pixel of the first gray-scale image to obtain the residual image. It should be noted that the regression analysis in the embodiment may obtain sufficient teaching, suggestions and implementation instructions according to a relevant image analysis technology in the field of image processing, which is thus not repetitively described here.

Figure 4:
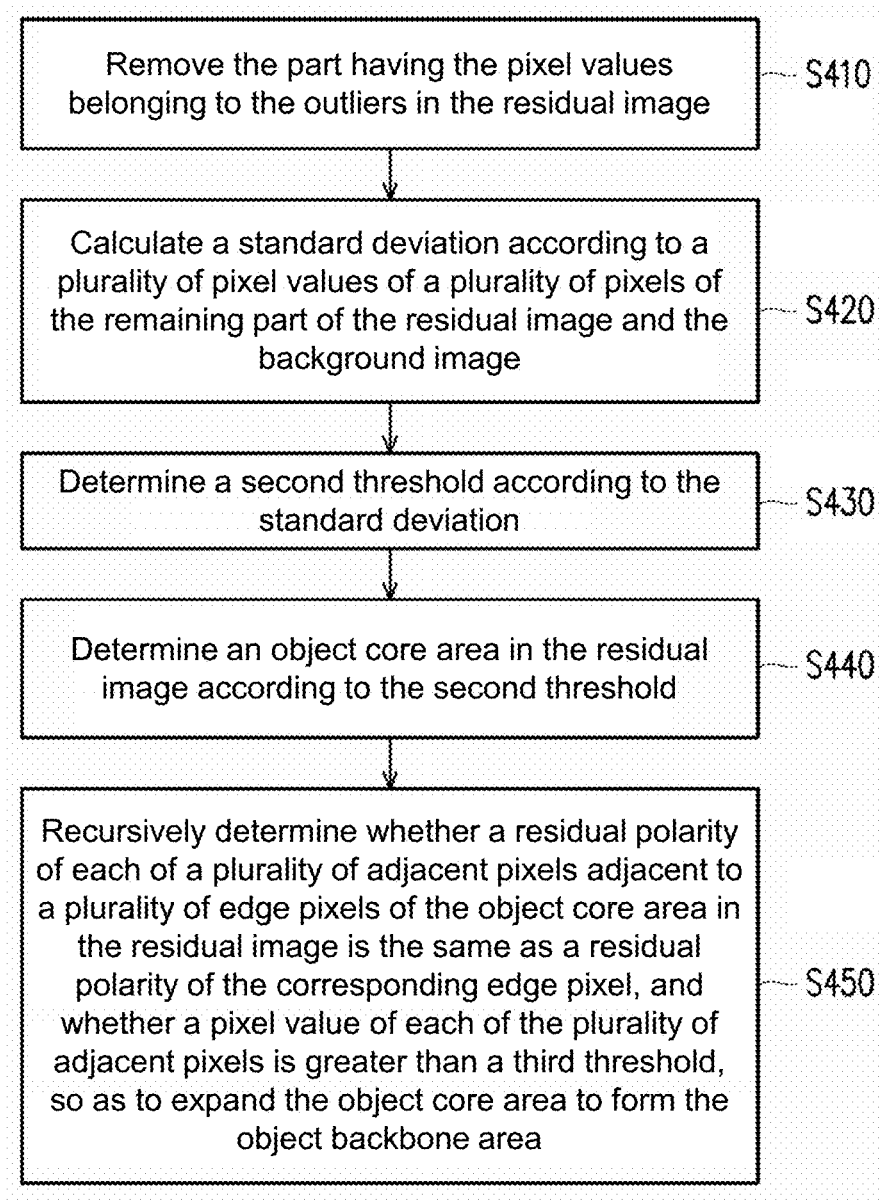
FIG. 4 is a flowchart of determining an object backbone area according to an embodiment of the invention.
Figure 5A:
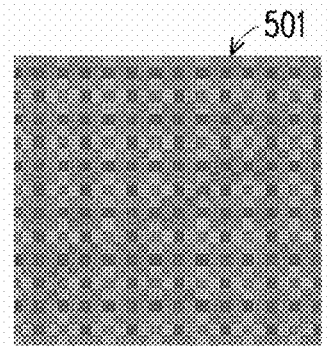
FIG. 5A to FIG. 5E are schematic pictures of a plurality of images according to an embodiment of the invention.
Figure 5B:
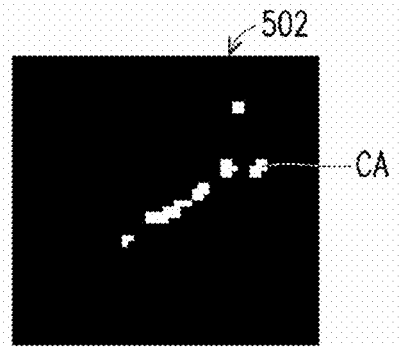
Figure 5C:
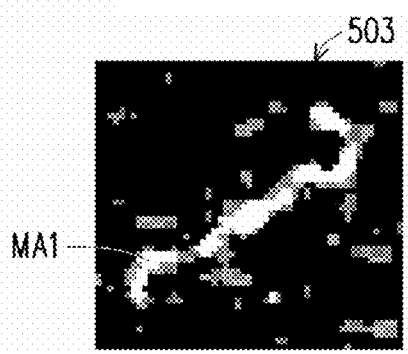
Figure 5D:
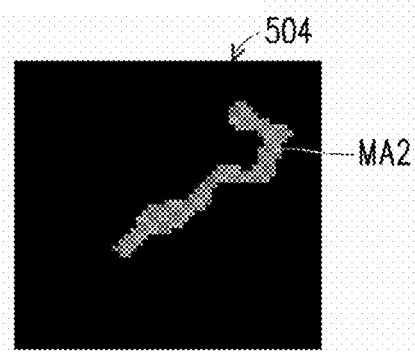
Figure 5E:
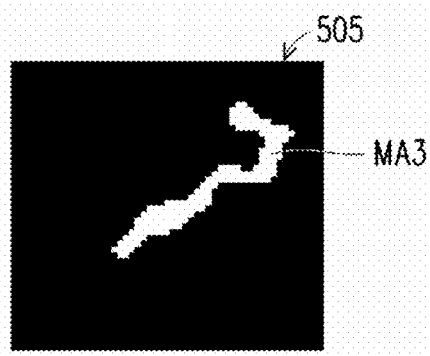

FIG. 4 is a flowchart of determining an object backbone area according to an embodiment of the invention. In one embodiment, with respect to step S220 of the embodiment illustrated in FIG. 2, the processor 110 may further perform steps S410 to S450 as illustrated in FIG. 4 to determine the object backbone area. In step S410, the processor 110 removes the part having the pixel values belonging to the outliers in the residual image. In step S420, the processor 110 calculates a standard deviation according to a plurality of pixel values of a plurality of pixels of the remaining part of the residual image and the background image. For example, the processor 110 may divide the residual image into a plurality of sub-image areas, generate a gray-scale histogram, remove large outliers in the histogram, and finally calculate the standard deviation of the residual image relative to the background image. In step S430, the processor 110 determines a second threshold according to the standard deviation. In step S440, the processor 110 determines a plurality of object core areas CA in the residual image 502 illustrated in FIG. 5B according to the second threshold. In the embodiment, the processor 110 binarizes an absolute value of the pixel value of each of the plurality of pixels in the residual image according to the second threshold determined according to the standard deviation, so as to determine the object core areas CA in the residual image. In step S450, the processor 110 recursively determines whether the residual polarity of each of the plurality of adjacent pixels adjacent to the plurality of edge pixels of the object core areas CA in the residual image 502 is the same as the residual polarity of the corresponding edge pixel, and whether the pixel value of each of the plurality of adjacent pixels is greater than a third threshold, so as to expand the object core areas CA to form the object backbone area MA1 in the image 503 illustrated in FIG. 5C.

It should be noted that, in the embodiment, the second threshold is obtained by multiplying the standard deviation by a predetermined gain value and adding a predetermined offset value. Moreover, in the embodiment, the third threshold is obtained by multiplying the second threshold by a first predetermined value, and the first predetermined value is smaller than 1 and greater than 0.

Figure 6:
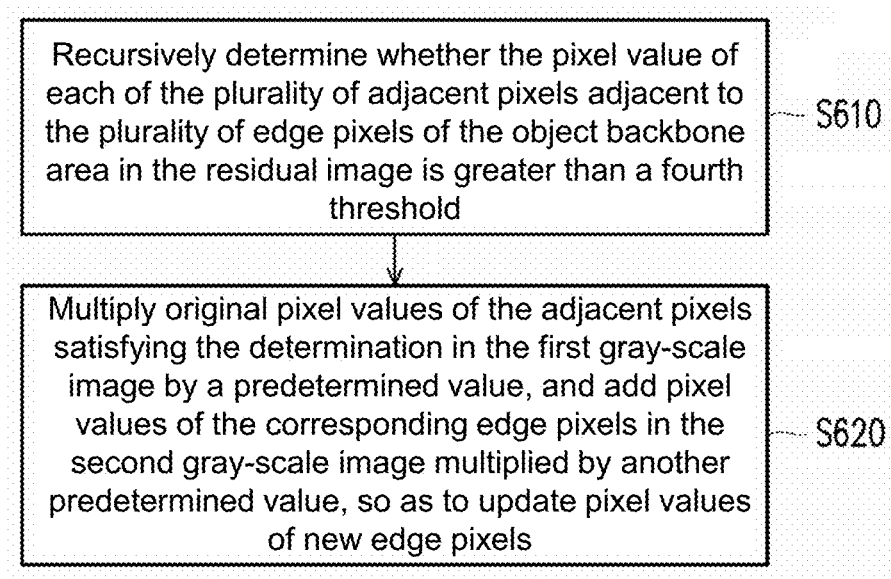
FIG. 6 is a flowchart of expanding an object backbone area in a second gray-scale image again according to an embodiment of the invention.

FIG. 6 is a flowchart of expanding an object backbone area in the second gray-scale image again according to an embodiment of the invention. Referring to FIG. 2, FIG. 5A to 5E and FIG. 6, in one embodiment, steps S610 and S620 may be continued after step S250 in FIG. 2 to make a range of the object backbone area in the second gray-scale image closer to an actual object. In step S610, the processor 110 recursively determines whether the pixel value of each of the plurality of adjacent pixels adjacent to the plurality of edge pixels of the object backbone area in the residual image is greater than a fourth threshold. In step S620, the processor 110 multiplies original pixel values of the adjacent pixels satisfying the determination in the first gray-scale image 501 by a predetermined value, and adds the pixel values of the corresponding edge pixels (for example, edges of the object backbone area MA3) in the second gray-scale image 505 multiplied by another predetermined value, so as to update pixel values of new edge pixels.

It should be noted that, in the embodiment, the fourth threshold is obtained by multiplying the third threshold by a second predetermined value, and the second predetermined value is smaller than 1 and greater than 0. Moreover, defining the adjacent pixels satisfying the determination as the new edge pixels refers to that the processor 110 multiplies the original pixel values of the adjacent pixels satisfying the determination in the first gray-scale image 501 by a third predetermined value, and adds the pixel values of the corresponding edge pixels in the second gray-scale image 505 multiplied by a fourth predetermined value, so as to update the pixel values of the new edge pixels in the second gray-scale image 505, wherein the third predetermined value plus the fourth predetermined value is equal to 1. In this regard, the new edge pixels will become edge pixels of a new object backbone area in the second gray-scale image 505. Therefore, steps S610 to S620 of the embodiment can effectively expand the range of the object backbone area MA3 in the second gray-scale image 505, so as to make the object image generated by the processor 110 closer to the actual object.

To sum up, the image segmentation method and the electronic device provided by the invention can capture the image towards the target area to obtain the image of the target area, and generates the gray-scale image according to the image of the target area. Then, the image segmentation method and the electronic device provided by the invention perform image analysis and processing on the gray-scale image to automatically segment the target object in the gray-scale image from the background image, so as to effectively extract the target object in the image of the target area.

The foregoing descriptions are merely exemplary embodiments of the invention, and certainly are not intended to limit the scope of implementation of the invention. That is, simple equivalent changes and modifications made according to the claims or summary of the invention still fall within the scope of the invention. In addition, any embodiment or claim in the invention does not need to implement all objectives, advantages, or features disclosed in the invention. In addition, the abstract and invention tile are used for assisting retrieve of the patent document, and are not intended to limit the protection scope of the invention. In addition, the terms "first", "second", and the like mentioned in this specification or the claims are used only to name elements or to distinguish between different embodiments or ranges, but are not intended to define the upper or lower limit of the number of elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image segmentation method comprising:
    obtaining a first gray-scale image;
    performing regression analysis on the first gray-scale image to obtain a residual image, and determining an object backbone area of the residual image;
    calculating an average gray-scale value of the object backbone area in the residual image to define a pixel value of each pixel in the object backbone area as the average gray-scale value, and generating a second gray-scale image having the object backbone area;
    recursively determining whether a residual polarity of each of a plurality of adjacent pixels adjacent to a plurality of edge pixels of the object backbone area in the residual image is the same as a residual polarity of the corresponding edge pixel, and whether a pixel value of each of the plurality of adjacent pixels in the residual image is greater than a respectively corresponding first threshold, so as to expand the object backbone area in the second gray-scale image; and
    extracting the object backbone area in the second gray-scale image subjected to the recursive determination as a target object.

2. The image segmentation method according to claim 1, wherein the step of performing the regression analysis on the first gray-scale image to obtain the residual image comprises:
    performing second-order regression analysis on the first gray-scale image to remove a part having pixel values belonging to outliers in the first gray-scale image;
    performing fourth-order regression analysis on the first gray-scale image subjected to the second-order regression analysis to estimate a background image; and
    subtracting a pixel value of each pixel of the background image from a pixel value of each pixel of the first gray-scale image to obtain the residual image.

3. The image segmentation method according to claim 2, wherein the first threshold respectively corresponding to the plurality of adjacent pixels is a median of a pixel value of a respectively corresponding edge pixel in the second gray-scale image and a pixel value of a respectively corresponding adjacent pixel in the background image.

4. The image segmentation method according to claim 2, wherein the step of determining the object backbone area of the residual image comprises:
    removing the part having the pixel values belonging to the outliers in the residual image;
    calculating a standard deviation according to a plurality of pixel values of a plurality of pixels of a remaining part of the residual image and the background image;
    determining a second threshold according to the standard deviation;
    determining an object core area in the residual image according to the second threshold; and
    recursively determining whether a residual polarity of each of a plurality of adjacent pixels adjacent to a plurality of edge pixels of the object core area in the residual image is the same as a residual polarity of the corresponding edge pixel, and whether a pixel value of each of the plurality of adjacent pixels is greater than a third threshold, so as to expand the object core area to form the object backbone area.

5. The image segmentation method according to claim 4, wherein the step of determining the second threshold according to the standard deviation comprises:
    multiplying the standard deviation by a predetermined gain value and adding a predetermined offset value to obtain the second threshold.

6. The image segmentation method according to claim 5, wherein the third threshold is obtained by multiplying the second threshold by a first predetermined value, and the first predetermined value is smaller than 1 and greater than 0.

7. The image segmentation method according to claim 4, wherein the step of determining the object core area in the residual image according to the second threshold comprises:
   binarizing an absolute value of the pixel value of each of the plurality of pixels of the residual image according to the second threshold, so as to determine the object core area in the residual image.

8. The image segmentation method according to claim 4, wherein the step of recursively determining the plurality of adjacent pixels adjacent to the plurality of edge pixels of the object backbone area in the residual image further comprises:
   recursively determining whether the pixel value of each of the plurality of adjacent pixels adjacent to the plurality of edge pixels of the object backbone area in the residual image is greater than a fourth threshold to define the adjacent pixels satisfying the determination as new edge pixels, so as to expand the object backbone area in the second gray-scale image.

9. The image segmentation method according to claim 8, wherein the fourth threshold is obtained by multiplying the third threshold by a second predetermined value, and the second predetermined value is smaller than 1 and greater than 0.

10. The image segmentation method according to claim 8, wherein the step of defining the adjacent pixels satisfying the determination as the new edge pixels comprises:
    multiplying original pixel values of the adjacent pixels satisfying the determination in the first gray-scale image by a third predetermined value, and adding the pixel values of the corresponding edge pixels in the second gray-scale image multiplied by a fourth predetermined value, so as to update the pixel values of the new edge pixels, wherein a sum of the third predetermined value and the fourth predetermined value is 1.

11. An electronic device having an image segmentation function, comprising an image sensor and a processor, wherein
    the image sensor is configured to obtain a first gray-scale image towards a target area; and
    the processor is coupled to the image sensor and is configured to execute the following operations:
       performing regression analysis on the first gray-scale image to obtain a residual image, and determining an object backbone area of the residual image; calculating an average gray-scale value of the object backbone area in the residual image to define a pixel value of each pixel in the object backbone area as the average gray-scale value, and generating a second gray-scale image having the object backbone area;
       recursively determining whether a residual polarity of each of a plurality of adjacent pixels adjacent to a plurality of edge pixels of the object backbone area in the residual image is the same as a residual polarity of the corresponding edge pixel, and whether a pixel value of each of the plurality of adjacent pixels in the residual image is greater than a respectively corresponding first threshold, so as to expand the object backbone area in the second gray-scale image; and extracting the object backbone area in the second gray-scale image subjected to the recursive determination as a target object in the target area.

12. The electronic device according to claim 11, wherein the operation of performing the regression analysis on the first gray-scale image to obtain the residual image comprises:
    performing second-order regression analysis on the first gray-scale image to remove a part having pixel values belonging to outliers in the first gray-scale image;
    performing fourth-order regression analysis on the first gray-scale image subjected to the second-order regression analysis to estimate a background image; and
    subtracting a pixel value of each pixel of the background image from a pixel value of each pixel of the first gray-scale image to obtain the residual image.

13. The electronic device according to claim 12, wherein the first threshold respectively corresponding to the plurality of adjacent pixels is a median of a pixel value of a respectively corresponding edge pixel in the second gray-scale image and a pixel value of a respectively corresponding adjacent pixel in the background image.

14. The electronic device according to claim 12, wherein the operation of determining the object backbone area of the residual image comprises:
    removing the part having the pixel values belonging to the outliers in the residual image;
    calculating a standard deviation according to a plurality of pixel values of a plurality of pixels of a remaining part of the residual image and the background image;
    determining a second threshold according to the standard deviation;
    determining an object core area in the residual image according to the second threshold; and
    recursively determining whether a residual polarity of each of a plurality of adjacent pixels adjacent to a plurality of edge pixels of the object core area in the residual image is the same as a residual polarity of the corresponding edge pixel, and whether a pixel value of each of the plurality of adjacent pixels is greater than a third threshold, so as to expand the object core area to form the object backbone area.

15. The electronic device according to claim 14, wherein the operation of determining the second threshold according to the standard deviation comprises:
    multiplying the standard deviation by a predetermined gain value and adding a predetermined offset value to obtain the second threshold.

16. The electronic device according to claim 15, wherein the third threshold is obtained by multiplying the second threshold by a first predetermined value, and the first predetermined value is smaller than 1 and greater than 0.

17. The electronic device according to claim 14, wherein the operation of determining the object core area in the residual image according to the second threshold comprises:
    binarizing an absolute value of the pixel value of each of the plurality of pixels of the residual image according to the second threshold, so as to determine the object core area in the residual image.

18. The electronic device according to claim 14, wherein the operation of recursively determining the plurality of adjacent pixels adjacent to the plurality of edge pixels of the object backbone area in the residual image further comprises:
    recursively determining whether the pixel value of each of the plurality of adjacent pixels adjacent to the plurality of edge pixels of the object backbone area in the residual image is greater than a fourth threshold to define the adjacent pixels satisfying the determination as new edge pixels, so as to expand the object backbone area in the second gray-scale image.

* * * * *